US007937491B1

(12) United States Patent
Ng

(10) Patent No.: US 7,937,491 B1
(45) Date of Patent: May 3, 2011

(54) ON-DEMAND INITIALIZATION OF SERVICES IN AN APPLICATION SERVER

(75) Inventor: Tony C. Ng, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1951 days.

(21) Appl. No.: 10/864,127

(22) Filed: Jun. 9, 2004

(51) Int. Cl.
*G06F 15/173* (2006.01)
*G06F 15/16* (2006.01)

(52) U.S. Cl. ........................................ 709/238; 709/203

(58) Field of Classification Search .................. 709/238, 709/203
See application file for complete search history.

(56) References Cited

U.S. PATENT DOCUMENTS

| | | | |
|---|---|---|---|
| 6,343,287 B1 * | 1/2002 | Kumar et al. ..................... | 707/4 |
| 6,604,140 B1 * | 8/2003 | Beck et al. ..................... | 709/226 |
| 6,836,889 B1 * | 12/2004 | Chan et al. ..................... | 719/310 |
| 7,263,560 B2 * | 8/2007 | Abdelaziz et al. ............ | 709/238 |
| 2004/0044727 A1 * | 3/2004 | Abdelaziz et al. ............ | 709/203 |
| 2004/0172618 A1 * | 9/2004 | Marvin ......................... | 717/116 |
| 2005/0030555 A1 * | 2/2005 | Phenix et al. .................. | 358/1.1 |
| 2005/0278223 A1 * | 12/2005 | Petev et al. .................... | 705/22 |

OTHER PUBLICATIONS

Todd Sundsted, "JNDI Overview, Part 1: An Introduction to Naming Services," www.javaworld.com/javawoorld/jw-01-2000/jw-01-howto_p.html, Jan. 2000, (6 pages).
JNDI 1.2: Modifications to JNDI 1.1 Packages, http://javasun.com/products/jndi/1.2/mods.html, 1999, (5 pages).
Kevin LoGuidice, "Appling Proxy Pattern to Details Object for Lazy Loading," www.theserverside.com/common/printthread.tss?thread_id=2262, Nov. 25, 2000, (4 pages).

* cited by examiner

*Primary Examiner* — Phuoc Nguyen
*Assistant Examiner* — Mark D Fearer
(74) *Attorney, Agent, or Firm* — Robert C. Kowert; Meyertons, Hood, Kivlin, Kowert & Goetzel, P.C.

(57) ABSTRACT

Various embodiments of a system and method for initializing application server services on demand are disclosed. In one embodiment, an application server may provide clients with a variety of services, where the clients may be applications and/or other services. During startup of the application server, some of these services may be initialized while others may not be initialized. In most embodiments, services necessary to the basic function of the application server, like a naming service, may be initialized during startup, while other services, e.g. transaction management, may go un-initialized. The naming service may include an on-demand service initiator, which may intercept service lookup requests. The on-demand service initiator may determine whether a requested service has been initialized, and if not, may initiate the initialization of the requested service.

12 Claims, 7 Drawing Sheets

ON-DEMAND INITIALIZATION OF SERVICES IN AN APPLICATION SERVER

BACKGROUND

1. Field of the Invention

This invention relates to computer systems, and more particularly to the initialization of services in an application server.

2. Description of the Related Art

An application server is a program executing on a computer in a distributed application network that provides services for one or more application programs. The application server is frequently viewed as part of a three-tier application, including a user interface tier, an application tier (business logic), and a backend tier (database, transactional systems, legacy systems, etc.). The first tier may provide a Web browser-based interface to the user, usually at a personal computer or workstation. In the middle-tier, the application server may provide numerous services to a business logic application or set of applications, possibly executing on a local area network or intranet computer. In the third or back-end tier, database and transaction servers, often executing on a mainframe or large computer, provide data needed by the business logic applications.

The application server provides services that are commonly required by business logic applications. Many of these services are available to be called as functions from the application code without the need for each application programmer to implement them explicitly within the code. Examples of services made available to applications by an application server may include mail services, transaction services, asynchronous messaging, database connectivity, naming and directory services, and security and authentication services. In general, the more services made available to applications as part of an application server, the easier it should be to implement business logic applications.

However, the startup time of an application server typically increases as more services are added due to the need to initialize each service. In applications where high availability is important, it may be beneficial to have a short startup or restart time for application servers.

One way to address this concern might be to customize each service in an application server for delayed initialization. Each individual service might be augmented to include a lazy initialization component to delay initialization of the service until a request is received for the service. This requires customization for each service and increases the complexity of service development and adding additional services to the application server.

SUMMARY

Various embodiments of a system and method for initializing application server services on demand are disclosed. In one embodiment, an application server may provide clients with a variety of services, where the clients may be applications and/or other services. During startup of the application server, some of the application server services may be initialized while initialization of other application server services may be delayed. Delaying initialization of some application server services may result in a faster startup or restart time for the application server. Services necessary to the basic function of the application server, including a naming service, may be initialized during startup, while initialization of other services, e.g. transaction management, may be delayed. The application server's naming service may include an on-demand service initiator, which may intercept service lookup requests. The on-demand service initiator may determine whether a requested service has been initialized, and if not, may initiate the initialization of the requested service. Application server services may include: Java servlets, Java Server Pages, Enterprise JavaBeans, RMI-IIOP, Object Request Broker, mail services, transaction services, asynchronous messaging, database connectivity, Enterprise Connector Architecture, XML processing, Management Extensions, and security and authentication services. Individual application server services are not necessarily configured to implement delayed or "lazy" initialization themselves. Instead, lazy initialization is implemented for one or more application server services through the application server's naming service.

In one embodiment, Java naming and directory interface (JNDI) may provide an API for accessing the naming service included in application server. JNDI may provide a context interface through which clients may locate required objects. A context may represent a set of bindings within a naming service that share the same naming convention. A context object may provide methods for binding names to objects, unbinding names from objects, renaming objects, and listing bindings. In some embodiments, the on-demand service initiator of a naming service may determine whether a requested service has been initialized, by determining if a binding has been established for the corresponding service within the naming service.

The time required to initialize a service may vary from service to service. When a client submits a service lookup request to the naming service there may be an associated timeout period associated with this request within which the client expects to receive the requested object. Should the naming service not return the requested object within this length of time, the client may generate an error message. In one embodiment, the on-demand service initiator within the naming service may include information on request timeout periods as well as initialization times for services. When a client issues a request for a previously un-initialized service, on-demand service initiator may compare the timeout period for the request with the initialization time for the requested service. If the initialization time for the requested service is longer than the timeout period, on-demand service initiator may initiate the initialization of the requested service and, prior to the expiration of the timeout period, return a response to the requesting client that causes the client to re-submit the service request. For services with long initialization periods, this exchange of messages may occur several times during the period in which the requested service is being initialized. In this way on-demand service initiator may circumvent the generation of error messages by clients. When the requested service is available, the naming service may return the corresponding object to the requesting client.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
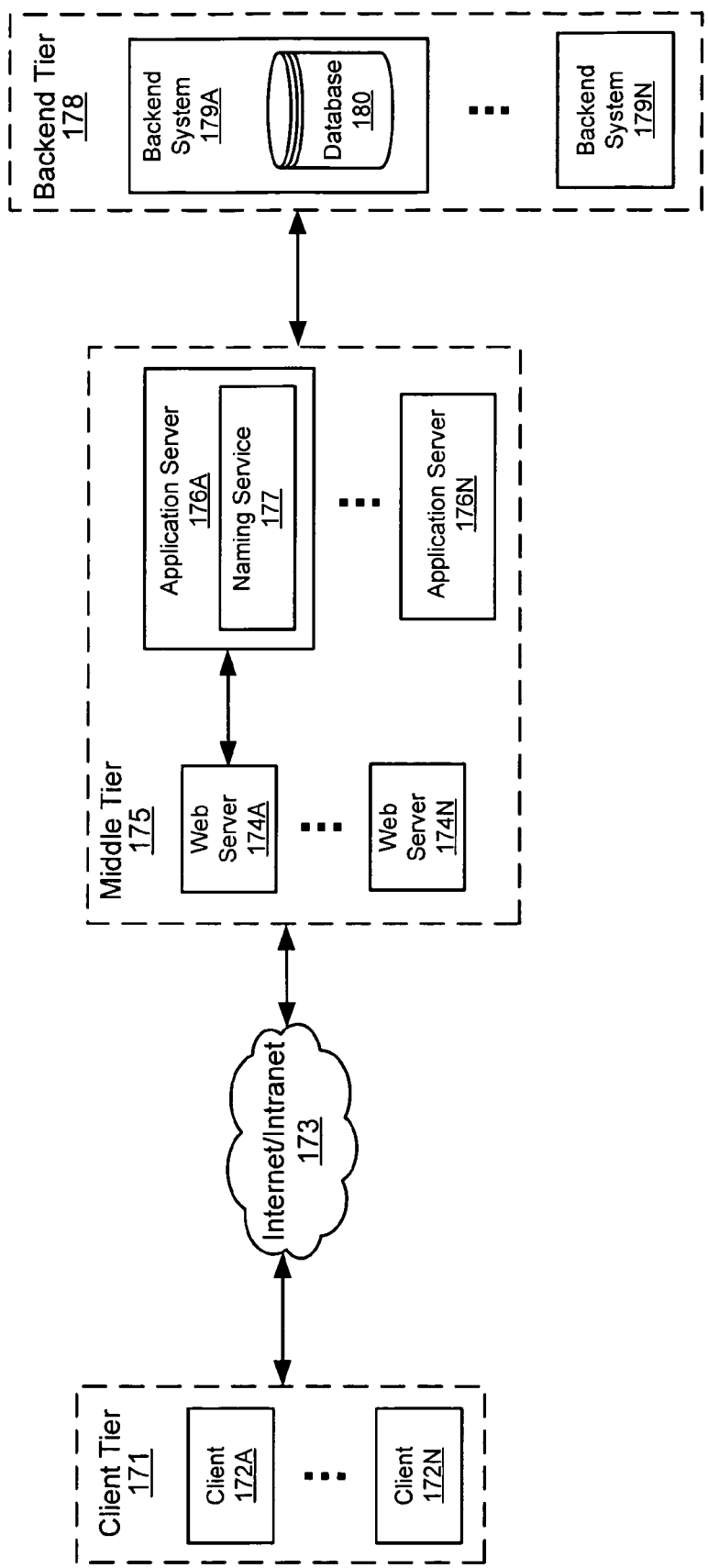
FIG. 1 illustrates a three-tier architecture of a computer system, suitable for implementing various embodiments.

FIG. 1 illustrates a three-tier architecture of a computer system, which may be suitable for implementing various embodiments of the disclosed invention. The application logic of the computer system may be divided into application components (e.g., applets, servlets, server pages, beans, application clients, database objects) according to function, and the various application components may be installed on different computers depending on factors such as security and load distribution. Tiers (e.g., client tier 171, middle tier 175, backend tier 178) may represent the logical or physical organization of the application components, which may operate across one or more different computers. The different computers may be based on different platforms and architectures. In one embodiment, the application components of the computer system may be based on a three-tier architecture. In other embodiments, the application components of the computer system may be based on a two-tier or N-tier architecture.

Client tier 171 may include a number of different clients 172A through 172N (e.g., device, system, user interface) communicating to application components (e.g., servlets, server pages, beans) in the middle tier 175 via the Internet/Intranet 173. The middle tier 175 may include a number of different Web servers 174A through 174N and/or application servers 176A through 176N. In some embodiments, an application server 176 may include functionality typically provided by a Web server 174. For example, functionality provided by a Web server 174 may be included in an application server 176 eliminating the need for the separate Web server 174. The backend tier 178 may include a number of different computer systems 179A through 179N including data resources such as database 180.

Application components may communicate using different types of protocols and technologies such as Hyper Text Transfer Protocol Secure sockets (HTTPS), Java™ Database Connectivity (JDBC), and/or Simple Object Access Protocol (SOAP). The application components within a tier typically communicate with remote application components in an adjacent tier. For example, users with access to a client server component configured to operate in client tier 171 (e.g., an application client accessible via a Web browser) may initiate requests to remote application components configured to operate in middle tier 175. Application components in the middle tier 175 may, in turn, initiate requests to the backend tier 178 to satisfy requests of the client components in the client tier 171. For example, an application component in the middle tier 175 (e.g., bean) may receive a remote request from a Web browser operating in the client tier 171 and in response access a backend component (e.g., database object) operating in the backend tier 178. The backend application component operating in the backend tier 178 may then provide a response to the business application component operating in middle tier 175 which may complete the remote request by providing requested information to the client application component operating in the client tier 171.

Application components operating within the middle tier 175 may be configured to utilize services provided by an application server 176A. Some standard services, which may be provided for applications include: Java servlets, Java Server Pages, Enterprise JavaBeans, RMI-IIOP, Object Request Broker, mail services, transaction services, asynchronous messaging, database connectivity, Enterprise Connector Architecture, XML processing, Management Extensions, naming and directory services, and security and authentication services. For example, application server 176A may provide middle tier components of distributed applications with naming service 177. Naming service 177 may provide a mechanism for clients of application server services to look up interface objects for those services.

In one embodiment, the naming service 177 may include functionality implementing delayed or "lazy" initialization of other application server services. For example, some application server services may not be immediately initialized when the application server starts up or restarts. Naming service 177 may be configured to determining whether a service for which it receives a lookup request has been initialized. Additionally, if the naming service 177 receives a request for an application server service and determines that the requested service has not been initialized, naming service 177 may initiate the initialization of the requested service.

Figure 2:
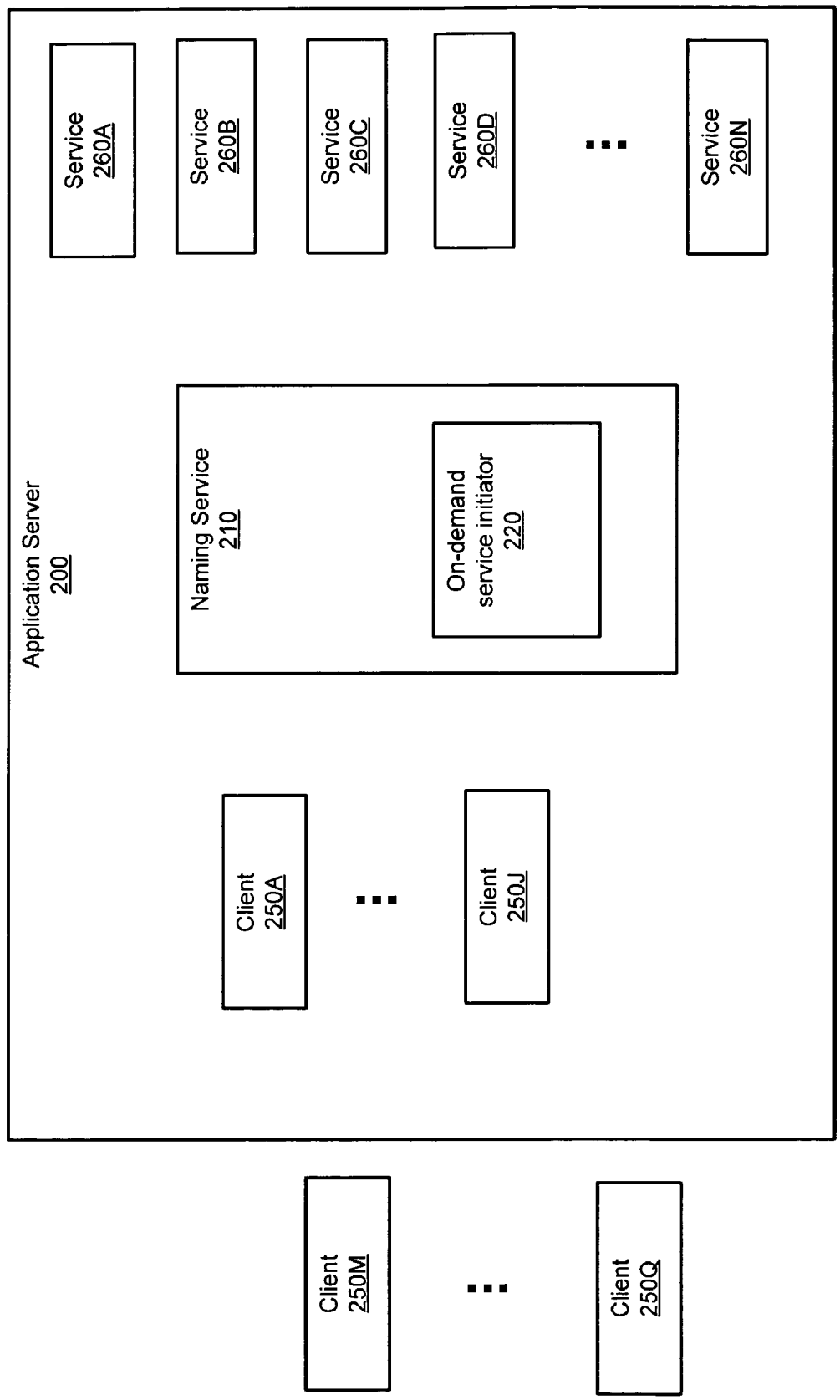
FIG. 2 illustrates the components of an application server, according to one embodiment.

FIG. 2 illustrates components of an application server 200, according to one embodiment. Application server 200 may include a naming service 210 along with various other services 260 as listed above. Naming service 210 may maintain a set of bindings, which relates names to objects. All objects in a given naming system may be named in the same way, that is, they may subscribe to the same naming convention. Clients 250 may use naming service 210 to locate objects by name.

Application server 200 may be configured to startup or restart without initializing certain services 260. In one embodiment, naming service 210 may include on-demand service initiator logic 220. On-demand service initiator 220 may include information on the initialization state of application server services 260. When a client 250 sends a lookup request for a service 260 to naming service 210, on-demand service initiator 220 may determine the initialization state of the requested service. To support this determination, on-demand service initiator 220 may maintain an initialization table including entries corresponding to each application server service 260. In some embodiments, this information may be included as an augmentation to the bindings maintained by naming service 210, while in other embodiments the initialization state table may be a separate entity.

A service lookup request may include the name of a requested service 260. On-demand service initiator 220 may use this name and the type of the request object to index the initialization state table to determine whether the requested service has previously been initialized. If on-demand service initiator 220 determines that the requested service has previously been initialized, naming service 210 may simply return the requested object to the client. However, if on-demand service initiator 220 determines that the requested service has not previously been initialized, it may initiate the initialization of the requested. After the requested service has been initialized, naming service 210 may return the requested object to the client service and update the initialization state table accordingly.

Figure 3:
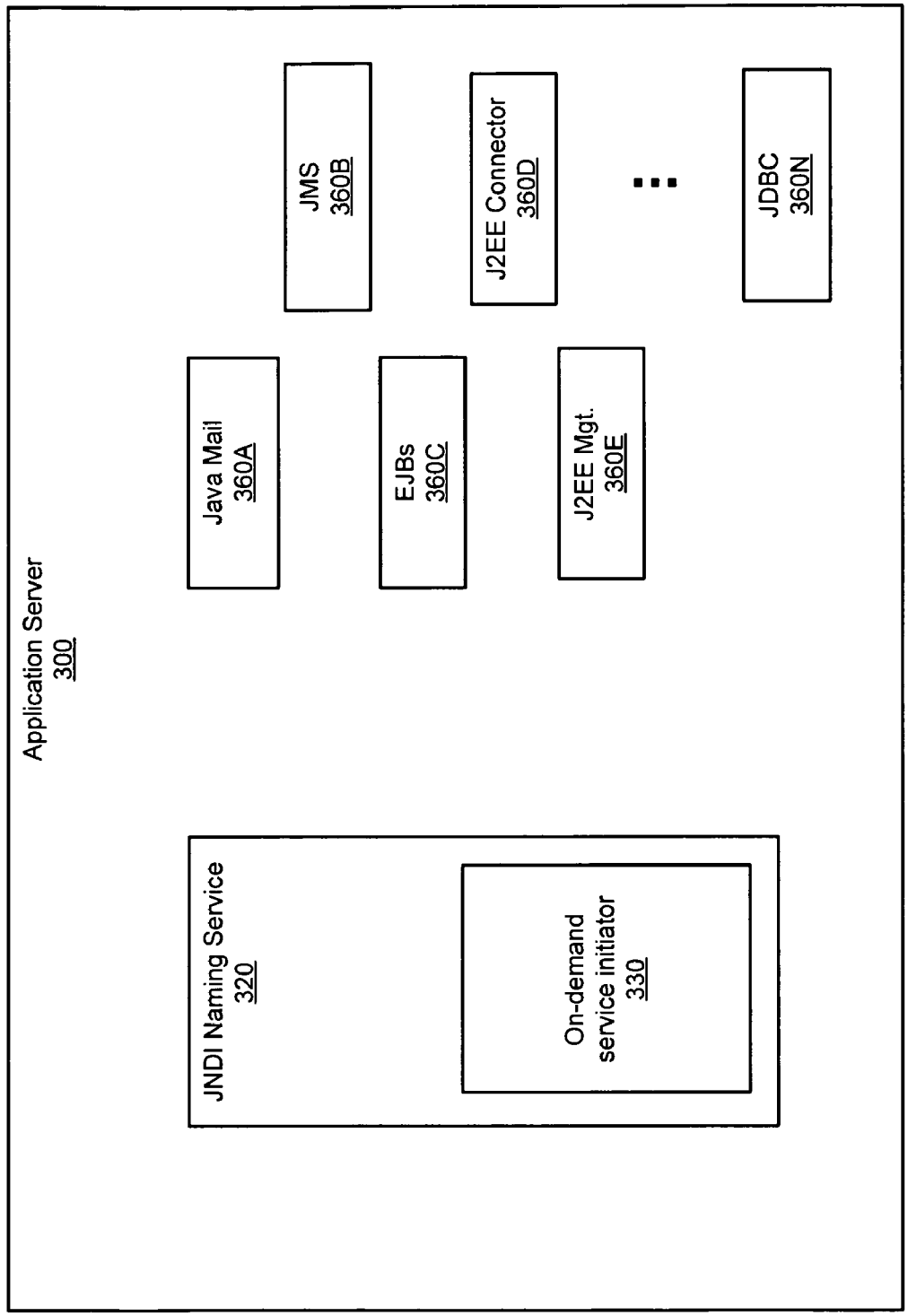
FIG. 3 illustrates specific components of an application server, according to one embodiment.

FIG. 3 illustrates specific components of an application server, according to one embodiment. The application server 300 may include a naming service 320 through which client may lookup interfaces to desired services. In one embodiment, naming service 320 may a Java Naming and Directory Interface (JNDI) naming service and may provide an API compliant with JNDI for accessing the naming service. Naming service 320 may provide a context interface through which clients may locate required objects. A context may represent a set of bindings within a naming service 340 that share the same naming convention. A context object may provide methods for binding names to objects, unbinding names from objects, renaming objects, and listing bindings.

In one embodiment, each service 360 provided by application server 300 may be registered with the naming service 320. For example, EJB 360C may be registered with JNDI 320 and EJB Home Objects may be bound to service EJB. During startup of the application server 300, some services 360 required for the internal functioning of the application server, such as the naming service 320, may be initialized. Other services, required only for the support of clients and not by the application server itself may not be initialized during application server 300 startup. For example, Java DataBase Connectivity service 360N may not be required by the application server 300 until clients begin requesting information included in backend databases. For example, JDBC DataSouce Objects may be bound in the naming service for JDBC 360N, which may not be initialized until application server 300 has entered its normal mode of operation and a lookup request for a JDBC DataSouce Object is received by the naming service 320.

In order to access an application server 300 service, for example Java Mail 360A, a client 250 may designate a context and call a naming service function through the JNDI interface for naming service 320. In one embodiment, the naming service may include on-demand service initiator 330 that may intercept the lookup request received by naming service 320, and determine whether Java Mail 360A has been initialized. In some embodiments, the existence of a binding for the requested service may indicate that the service has been initialized. In other embodiments, other indications such as field values associated with the service name, as described previously, may be used to determine the state of the service. If Mail 360A is available, then on-demand service initiator 330 may take no further action, and the naming service may return a Java Mail object. However, should Mail 360A not have been previously initiated within application server 300, on-demand service initiator 330 may initiate the initialization of this service. The naming service may return a Java Mail object to the requesting client when the service initialization has completed.

The time required to initialize a service 360 may vary from service to service. When a client submits a service lookup request to naming service 320 there may be an associated timeout period associated with this request within which the client expects to receive the requested object. Should the naming service not return the requested object within this length of time, the client may generate an error message. In one embodiment, on-demand service initiator 330 may include information on request timeout periods as well as initialization times for services. When a client issues a request for a previously un-initialized service, on-demand service initiator 330 may compare the timeout period for the request with the initialization time for the requested service. If the initialization time for the requested service is longer than the timeout period, on-demand service initiator 330 may initiate the initialization of the requested service and prior to the expiration of the timeout period, return a response to the requesting client that causes the client to re-submit the service request. For services with long initialization periods, this exchange of messages may occur several times during the period in which the requested service 360 is being initialized. In this way on-demand service initiator 330 may circumvent the generation of error messages by clients. When the requested service 360 is available, the naming service may return the corresponding object to the requesting client. In other embodiments, the naming service may simply return a retry message until the service is initialized.

Figure 4:
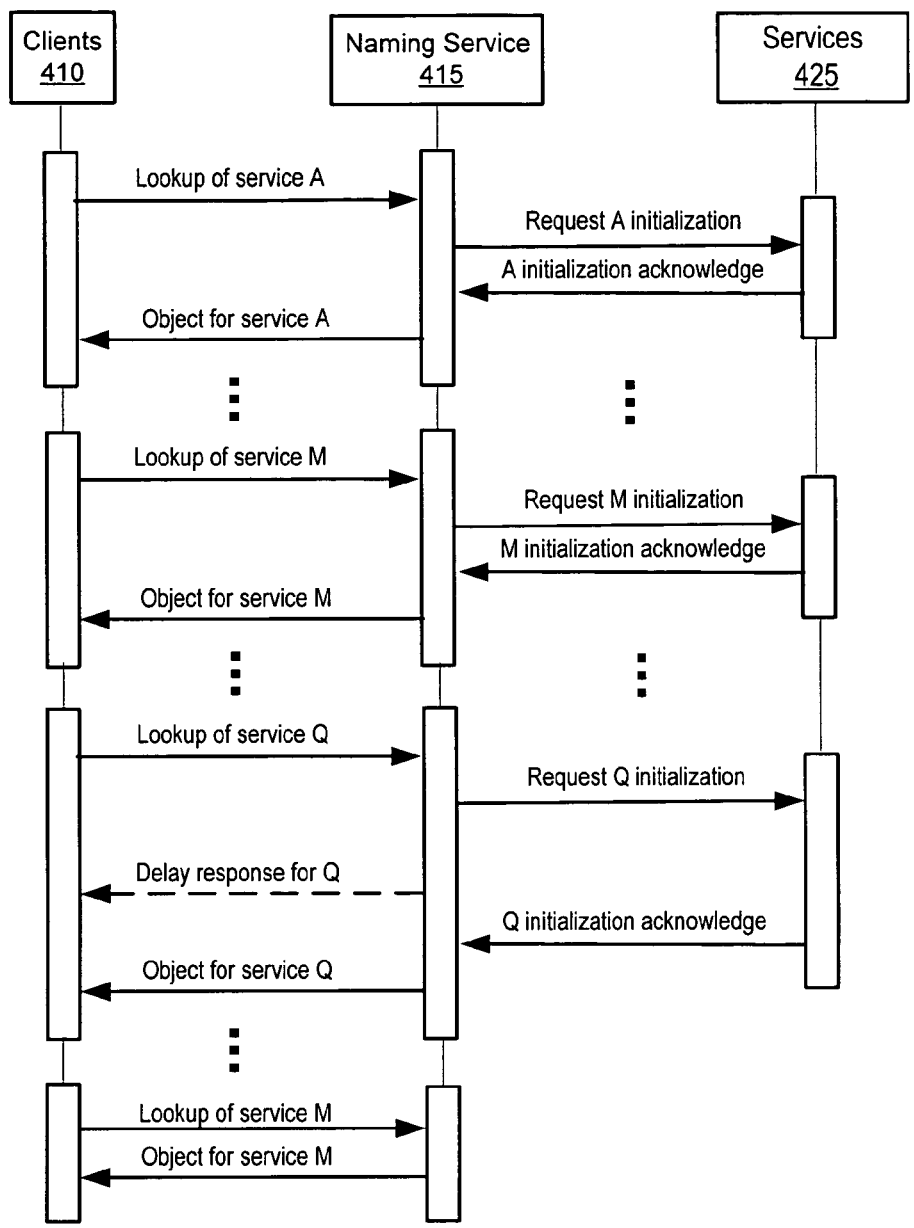
FIG. 4 illustrates the request/response flow for an on-demand service initiator, according to one embodiment.

FIG. 4 illustrates the request/response flow for an on-demand service initiator, according to one embodiment. After application server startup, clients 410 may issue lookup requests for needed services 425 to naming service 415. For a service 425 that was not initialized during application server startup, this may be the initial lookup for that service, and therefore the on-demand service initiator may initiate the initialization of these services.

For the request of a service, which has not been previously initialized, the message flow may follow that shown for service A on the graph. In response to the lookup of service A message, naming service 415 may determine that service A has not been initialized and generate a request service A initialization message to services 425. As described above, naming service 415 may also compare the initialization time for service A to the timeout period for the lookup request. As long as the initialization time for service A is less than the timeout period for the lookup request, naming service 415 may simply return an object for service A to requesting client 410 once the service is initialized.

The flow for the case in which the initialization time is longer than the timeout period for the request may correspond to that shown for service Q in the graph. The principal difference being that after requesting initialization of service Q, naming service 415 may respond to requesting client 410 with one or more delaying responses in order to prevent the generation or error messages. Upon receipt of the service Q initialization acknowledgment, naming service 415 may return an object for service Q to requesting client 410 as was the case with service A. Subsequent lookup requests for services that have been previously initiated may follow a message flow analogous to that illustrated for the second lookup of service M in the graph wherein the client requests the lookup of a service 425 and the naming service 415 returns an object corresponding to that service to the requestor.

Figure 5:
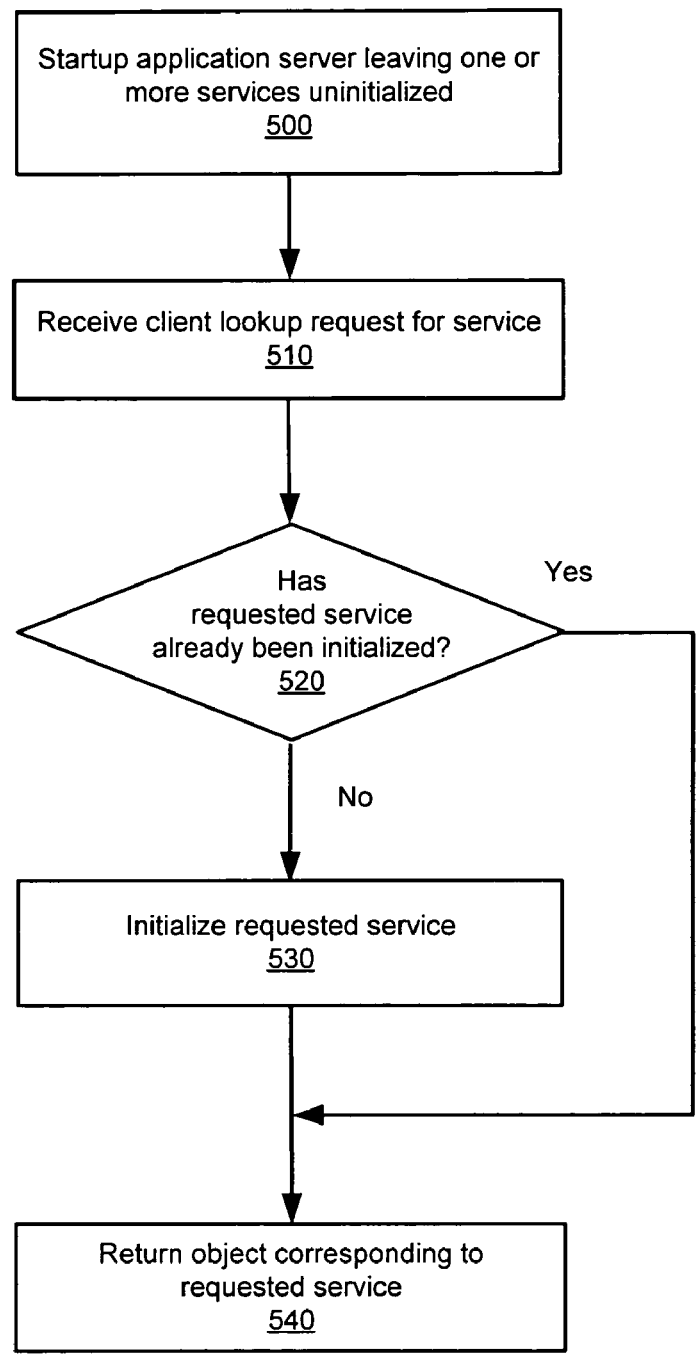
FIG. 5 is a flowchart of a method for operating a naming service, according to one embodiment.

FIG. 5 is a flowchart of a method for operating a naming service, according to one embodiment. At 500, an application server may undergo startup (or restart). During the startup process, services that are essential to the basic function of the application server, such as naming services, may be initialized. Other services, such as transaction management services, may be left un-initialized. Postponing the initialization of some application server services may reduce the amount of time required for application server startup. Once the application server has entered the normal operational mode, application clients may generate lookup requests for services.

At block 510, the application server's naming service may receive a request for a service object. The naming service may determine, at decision block 520 whether the requested service has already been initialized. In one embodiment, on-demand service initiator may use the name supplied in the service lookup request to index into an initialization state table to determine whether the requested service has previously been initialized. In another embodiment, the existence of a binding within the naming service may indicate that the corresponding service has been initialized. If the on-demand service initiator determines that the requested service has not previously been initiated, the service may be initialized at that time, as indicated in block 530. When the on-demand service initiator determines that the requested service is available, it may return a corresponding object to the client who initiated the request, as depicted in block 540.

Figure 6:
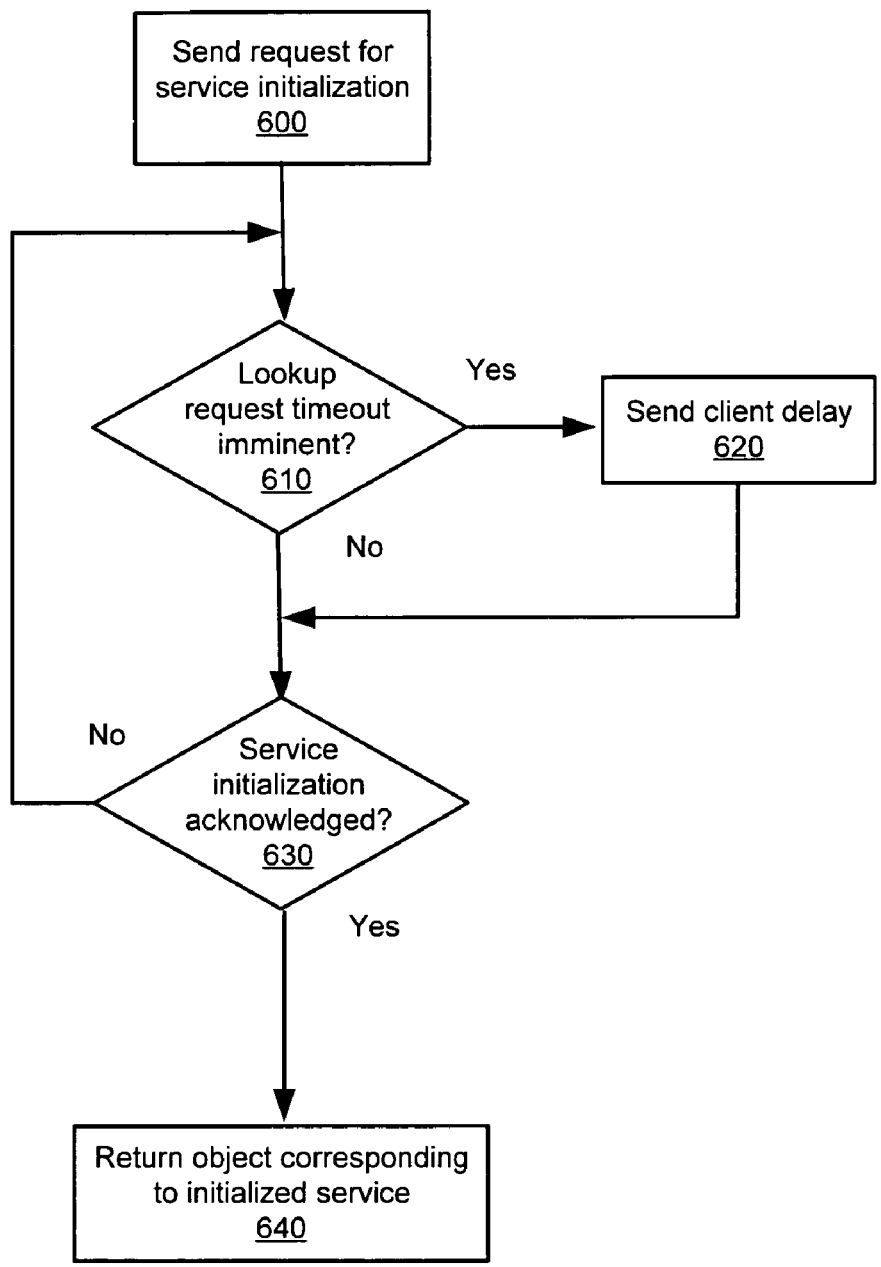
FIG. 6 is a flowchart of a method for operating an on-demand service initiator, according to one embodiment.

FIG. 6 is a flowchart of a method for lazy initialization through a naming service to avoid request errors due to initialization delays, according to one embodiment. In one embodiment, block 530 of FIG. 5 may be implemented according to the method of FIG. 6. At block 600, having determined that a requested service has not previously been initialized, the naming service may initiate the initialization of the requested service. While awaiting acknowledgement that the service initialization request has been fulfilled, the naming service may track elapsed time and determine whether the service lookup request is in danger of timing out, as indicated by decision block 610. If such a timeout is imminent, a client delay response or retry may be sent, as shown in block 620. As previously described, the client delay response may be a message that causes the client to restart its timeout or resubmit its service lookup request and may be sent to avoid the generation of an error message by the client. As depicted by decision block 630, until the service initialization acknowledgement is received, service request timeout periods may continue to be tracked, and additional client delay responses may be sent. When the service initialization acknowledgement is received, as determined at decision block 630, an object corresponding to the requested service may be returned to the requesting client, as depicted in block 640.

Figure 7:
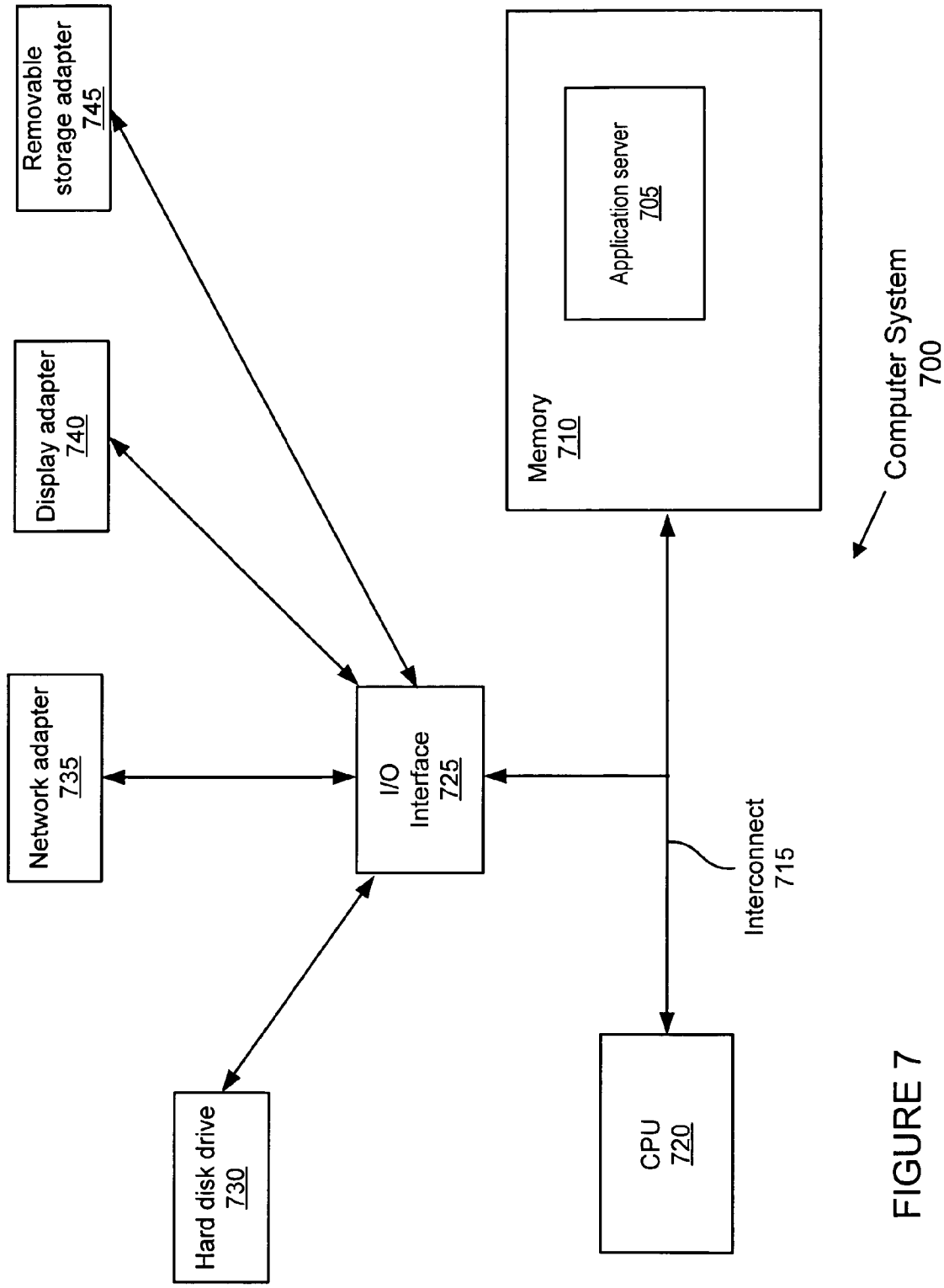
FIG. 7 illustrates an exemplary computer system that may include an application server as described herein, according to one embodiment.

FIG. 7 illustrates one embodiment of a computer system 700 that may include an application server 705 as described herein that implements lazy service initialization through its naming service. Computer system 700 may include many different components such as memory 710, a central processing unit (CPU) or processor 720, and an input/output (I/O) interface 725. Interconnect 715 is relied upon to communicate data from one component to another. For example, interconnect 715 may be a point-to-point interconnect, a shared bus, a combination of point-to-point interconnects and one or more buses, and/or a bus hierarchy including a system bus, CPU bus, memory bus and I/O buses such as a peripheral component interconnect (PCI) bus.

The computer system 700 preferably includes a memory medium on which computer programs according to various embodiments may be stored. The term "memory medium may include an installation medium, e.g., a CD-ROM, or floppy disk; a computer system memory such as DRAM, SRAM, EDO DRAM, SDRAM, DDR SDRAM, Rambus RAM, etc., or a non-volatile memory such as a magnetic media, e.g., a hard drive 730, or optical storage. The memory medium may include other types of memory as well, or combinations thereof. In addition, the memory medium may be located in a first computer in which the programs are executed, or may be located in a second different computer, which connects to the first computer over a network. In the latter instance, the second computer provides the program instructions to the first computer for execution.

Also, the computer system 700 may take various forms, including a personal computer system, mainframe computer system, workstation, network appliance, Internet appliance, personal digital assistant (PDA), television system or other device. In general, the term "computer system" can be broadly defined to encompass any device having a processor, which executes instructions from a memory medium. The memory medium preferably stores a software program or programs for event-triggered transaction processing as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), or other technologies or methodologies, as desired.

Memory 710 may store program instructions accessed by the CPU 720. For example, instructions and data implementing application server 705 may be stored in memory 710. On startup, application server 705 may delay the initialization of some services until a client requests the use of those services.

Computer system 700 may further include other software and hardware components, such as an input/output (I/O) interface 725, that may be coupled to various other components and memory 710. The CPU 720 may acquire instructions and/or data through the I/O interface 725. Through the I/O interface 725, the CPU 720 may also be coupled to one or more I/O components. As illustrated, I/O components may include a hard disk drive 730, a network adapter 735, a display adapter 740 and/or a removable storage adapter 745. Some components 730 to 745 may be coupled to the I/O interface 725. In addition, the computer system 700 may include one or more of a particular type of component. The computer system 700 may include one or more components coupled to the system through a component other than the I/O interface 725. Some computer systems may include additional and/or other components such as application software (e.g., stored in memory 710), other CPUs, video monitors or other displays, track balls, mice, keyboards, printers, plotters, scanners, or other types of I/O devices for use with computer system 700.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

The flow charts described herein represent exemplary embodiments of methods. The methods may be implemented in software, hardware, or a combination thereof. The order of method may be changed, and various elements may be added, reordered, combined, omitted, modified, etc.

Various modifications and changes may be made to the invention as would be obvious to a person skilled in the art having the benefit of this disclosure. For example, lazy initialization through a naming service as described herein may be provided for any type of server. It is intended that the following claims be interpreted to embrace all such modifications and changes and, accordingly, the specifications and drawings are to be regarded in an illustrative rather than a restrictive sense.

Various embodiments may further include receiving, sending or storing instructions and/or data implemented in accordance with the foregoing description upon a computer readable medium. Generally speaking, a computer readable medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

What is claimed is:

1. A system, comprising:
a processor; and
memory coupled to the processor and configured to store program instructions executable by the processor to implement an application server comprising a plurality of services registered with a naming service;
wherein the plurality of services comprises at least one service from the following group: an application component run-time service, an enterprise information systems connection service, a database connection service, or a messaging service;
wherein the naming service is initialized during startup of the application server;
wherein the application server starts up without initializing one or more of the plurality of services registered with the naming service;
wherein the naming service includes an on-demand service initiator that, for each individual service of the plurality of services registered with the naming service, has the capacity to:
in response to a lookup request received by the naming service from a requestor for the individual service, access current initialization state data for the individual service, wherein the current initialization state data tells whether the individual service is currently initialized;
determine whether the individual service is currently initialized, based on the current initialization state data for the individual service; and
initialize the individual service in response to determining that the individual service is not currently initialized; and
wherein the naming service is capable of returning to the requestor an object corresponding to the initialized individual service.

2. The system as recited in claim 1, wherein the naming service is Java Naming and Directory Interface (JNDI) compliant.

3. The system as recited in claim 1, wherein said determining whether the individual service is currently initialized further comprises the on-demand service initiator determining whether a binding is currently established for the particular service.

4. The system as recited in claim 1, wherein said initializing the individual service further comprises:
generating an initialization request for the individual service;
until the service is initialized, determining whether expiration of a timeout period for the lookup request is imminent; and
sending a delay response message to the requestor before the timeout period expires.

5. A method, comprising:
starting up an application server without initializing one or more of a plurality of services registered with a naming service, wherein the plurality of services comprises at least one service from the following group: an application component run-time service, an enterprise information systems connection service, a database connection service, or a messaging service;
initializing the naming service during said starting up the application server;
in response to the naming service receiving a lookup request from a requestor for the individual service, an on-demand service initiator of the naming service accessing current initialization state data for the individual service, wherein the current initialization state data tells whether the individual service is currently initialized;
the on-demand service initiator the determining whether the individual service is currently initialized, based on the current initialization state data for the individual service; and
the on-demand service initiator initializing the individual service in response to determining that the individual service is not currently initialized; and
the naming service returning to the requestor an object corresponding to the initialized individual service.

6. The method, as recited in claim 5, wherein the naming service is Java Naming and Directory Interface (JNDI) compliant.

7. The method, as recited in claim 5, wherein said determining whether the individual service is currently initialized further comprises the on-demand service initiator determining whether a binding is currently established for the particular service.

8. The method, as recited in claim 5, wherein said initializing the individual service further comprises:
generating an initialization request for the individual service;
until the service is initialized, determining whether expiration of a timeout period for the lookup request is imminent; and
sending a delay response message to the requestor before the timeout period expires.

9. A non-transitory computer-readable storage medium storing program instructions that when executed by a computer implement an application server comprising a plurality of services registered with a naming service, wherein the naming service is initialized during startup of the application server;
wherein the application server starts up without initializing one or more of the plurality of services registered with the naming service, wherein the plurality of services comprises at least one service from the following group: an application component run-time service, an enterprise information systems connection service, a database connection service, or a messaging service;
wherein the naming service includes an on-demand service initiator that, for each individual service of the plurality of services registered with the naming service, has the capacity to:
in response to a lookup request received by the naming service from a requestor for the individual service, access current initialization state data for the individual service, wherein the current initialization state data tells whether the individual service is currently initialized;
determine whether the individual service is currently initialized, based on the current initialization state data for the individual service; and
initialize the individual service in response to determining that that the individual service is not currently initialized; and wherein the naming service is capable of returning to the requestor an object corresponding to the initialized individual service.

10. The non-transitory computer-readable storage medium as recited in claim 9, wherein the naming service is Java Naming and Directory interface (JNDI) compliant.

11. The non-transitory computer-readable storage medium as recited in claim 9, wherein said determining whether the individual service is currently initialized further comprises the on-demand service initiator determining whether a binding is currently established for the particular service.

12. The non-transitory computer-readable storage medium as recited in claim 9, wherein said initializing the individual service further comprises:
- generating an initialization request for the individual service;
- until the service is initialized, determining whether expiration of a timeout period for the lookup request is imminent; and
- sending a delay response message to the requestor before the timeout period expires.

* * * * *